(12) United States Patent
Comte

(10) Patent No.: US 8,722,554 B2
(45) Date of Patent: May 13, 2014

(54) ALUMINOSILICATE GLASSES WITH IMPROVED FINING BEHAVIOUR

(75) Inventor: Marie Jacqueline Monique Comte, Fontenay aux Roses (FR)

(73) Assignee: Eurokera, Chateau-Thierry (FR)

( * ) Notice: Subject to any disclaimer, the term of this patent is extended or adjusted under 35 U.S.C. 154(b) by 156 days.

(21) Appl. No.: 13/183,831

(22) Filed: Jul. 15, 2011

(65) Prior Publication Data

US 2012/0035041 A1    Feb. 9, 2012

(51) Int. Cl.
C03C 3/091 (2006.01)
C03C 10/14 (2006.01)
C03C 10/12 (2006.01)

(52) U.S. Cl.
USPC ..................... 501/68; 501/4; 501/7

(58) Field of Classification Search
USPC .................. 501/66, 68, 4, 5, 6, 7; 65/134.5
See application file for complete search history.

(56) References Cited

U.S. PATENT DOCUMENTS

| | | | |
|---|---|---|---|
| 6,420,288 B2 * | 7/2002 | Schweiger et al. | 501/7 |
| 6,992,031 B2 | 1/2006 | Naumann et al. | 501/69 |
| 7,584,632 B2 * | 9/2009 | House et al. | 65/134.5 |
| 2007/0004578 A1 * | 1/2007 | Monique Comte | 501/4 |
| 2008/0002927 A1 | 1/2008 | Furnish | 385/12 |
| 2010/0224619 A1 | 9/2010 | Schoenberger et al. | 219/443.1 |

FOREIGN PATENT DOCUMENTS

| | | |
|---|---|---|
| DE | 100 34 985 C1 | 9/2001 |
| DE | 10 2008 050263 A1 | 4/2010 |
| DE | 102008/050263 | 4/2010 |
| EP | 1313675 | 5/2003 |
| EP | 2 226 303 A2 | 9/2010 |
| JP | 11100229 | 4/1999 |
| WO | 2010/137000 | 12/2010 |

OTHER PUBLICATIONS

International Commission on Glass, 2009, "Determination of Reducing Components in Glass Raw Materials", Handbook of Recommended Analytical Methods, pp. 33-38.

* cited by examiner

Primary Examiner — Noah Wiese
(74) Attorney, Agent, or Firm — Michael W. Russell

(57) ABSTRACT

Mineral materials selected from lithium aluminosilicate glasses containing vanadium, precursors of glass-ceramics, and glass-ceramics colored by vanadium contain solid solution(s) of β-quartz and/or β-spodumene as main crystalline phase. Also disclosed are articles made from said mineral materials, as well as methods for forming said glasses, glass-ceramics and articles of said glasses and glass-ceramics. Methods involve optimizing the refining of lithium aluminosilicate glasses containing $SnO_2$ as a fining agent in preparing glasses or glass-ceramics.

16 Claims, No Drawings

ALUMINOSILICATE GLASSES WITH IMPROVED FINING BEHAVIOUR

CROSS-REFERENCE TO RELATED APPLICATION(S)

This application claims the benefit of priority under 35 U.S.C. §119 of French Patent Application Serial No. FR 1056406, filed on Aug. 3, 2010, the content of which is relied upon and incorporated herein by reference in its entirety.

BACKGROUND

The present disclosure relates to lithium aluminosilicate glasses containing vanadium, and to glass-ceramics colored by vanadium containing solid solution(s) of β-quartz and/or β-spodumene as main crystalline phase, these glass-ceramics being suitable for use at high temperatures. More particularly, the disclosure relates to the refinement of lithium aluminosilicate glasses containing $SnO_2$ as a fining agent. The $SnO_2$ is a substitute for $As_2O_3$ and $Sb_2O_3$, which are conventional but toxic fining agents used to prepare glasses or glass-ceramics.

In embodiments, the disclosure relates to mineral materials selected from lithium aluminosilicate glasses containing vanadium, advantageously precursors of glass-ceramics, and glass-ceramics colored by vanadium containing solid solution(s) of β-quartz or(and) β-spodumene as main crystalline phase, articles of said mineral materials, and methods for making said glasses, glass-ceramics and articles.

Glass-ceramics containing solid solution(s) of β-quartz and/or β-spodumene as main crystalline phase can be obtained via heat treatment of glasses. The manufacture of articles of these glass-ceramics conventionally comprises the three successive main steps of (i) melting and refining a vitrifiable batch mixture (i.e., a batch mixture able to be turned to glass and comprising (pre-existing) mineral glass (es) (cullets) and/or a mixture of mineral raw materials), generally applied between 1,550 and 1,750° C. (refining is actually suitable for removing as efficiently as possible the gas inclusions from the obtained glass melt), (ii) cooling (during which any devitrification is opportunely avoided) and shaping the obtained glass melt, and (iii) crystallizing or ceramming the shaped, cooled glass by a suitable heat treatment (including the successive phases for nucleation and growth of crystals).

Within the scope of obtaining lithium aluminosilicate glasses, glass-ceramics containing solid solution(s) of β-quartz and/or β-spodumene as main crystalline phase and articles of such materials, gas inclusions are opportunely efficiently removed from the glass melt. For this purpose, at least one fining agent is used. Conventionally, manufacturers of glasses and glass-ceramics have used $As_2O_3$ and/or $Sb_2O_3$ as a fining agent. However, as $As_2O_3$ and $Sb_2O_3$ are known toxins, a new trend has recently developed in order to ban these compounds and to use tin oxide $SnO_2$ as a fining agent in methods for refining lithium aluminosilicate glasses to prepare glasses or glass-ceramics. Insofar that tin oxide can be less efficient than conventional fining agents, its use often involves higher melting and/or fining temperatures than those used conventionally.

Patent application EP-A-1 313 675 well illustrates this problem and describes the use of $SnO_2$ as a fining agent and as a reducing agent of $V_2O_5$ in glasses precursor of β-quartz glass-ceramics. Refining is carried out in the examples at 1,640° C. or at 1,975° C. Mixed refining is illustrated, which comprises both chemical (with $SnO_2$) and physical refining (applied at a temperature of 1,975° C. for one hour). EP-A-1 313 675 teaches that fining with tin oxide is only satisfactory at a temperature of the order of 2,000° C.

Various solutions have been proposed in order to lower these high fining temperatures in refining processes where tin oxide is used.

Patent application DE-A-10 2008 050 263 describes β-quartz glass-ceramics displaying special transmission features. This document teaches that it is necessary to obtain an oxygen equilibrium partial pressure of 1 bar at temperatures above 1,580° C., and preferably above 1,640° C., and that reducing agents should be added into the glass melt in order to increase the coloration effect from vanadium oxide. Moreover, this document indicates that with fining temperatures beyond 1,700° C., and advantageously above 1,750° C., it is possible to obtain better fining quality of the precursor glasses (a number of bubbles of less than 10, and preferably less than 5 per kg of glass is then obtained) when iron oxide $Fe_2O_3$ assists tin oxide in the refining process.

Finally, patent applications JP-A-11100229, US-A-2007 0004578 and US-A-2008 0026927 disclose the use of halides (chlorides, fluorides and bromides, respectively) in addition to tin oxide $SnO_2$ to improve fining. Refining processes below 1,700° C. are described. However, the use of these compounds is complicated insofar as they evaporate during melting and may form toxic compounds.

Therefore, there exists a real need for developing lithium aluminosilicate glasses, advantageously precursors of glass-ceramics, refined with tin oxide at temperatures below 1,700° C. and both free of toxic compounds, such as antimony and arsenic oxides, and of compounds generating toxic compounds such as halides.

In this context, the present disclosure describes mineral materials selected from lithium aluminosilicate glasses containing vanadium, advantageously precursors of glass-ceramics, and glass-ceramics colored by vanadium containing solid solution(s) of β-quartz and/or β-spodumene as main crystalline phase. The compositions of said materials are free of toxic compounds (arsenic and antimony) and of compounds generating toxic compounds (halides), but may however be melted and refined (with $SnO_2$ as fining agent), under the same industrial conditions, notably at temperatures below 1,700° C., as the compositions of the prior art containing $As_2O_3$ and/or $Sb_2O_3$. Said compositions lead to quality glasses or glass-ceramics. This is particularly interesting from an economic point of view.

According to a first embodiment, the present disclosure relates to mineral materials selected from lithium aluminosilicate glasses containing vanadium and glass-ceramics colored by vanadium containing solid solution(s) of β-quartz and/or or β-spodumene as main crystalline phase, advantageously containing a solid solution of β-quartz as main crystalline phase. Said materials have a composition free of arsenic oxide and antimony oxide, except for inevitable traces (i.e., generally $As_2O_3+Sb_2O_3<500$ ppm) and, expressed in percentages by weight of oxides, further comprise from 0.24 to 0.36% of $SnO_2$, from 0.030 to 0.060% of $V_2O_5$, and from 0.075 to 0.095% of $Fe_2O_3$. The disclosed materials have a chemical oxygen demand of less than 0.18 mg $O_2$/g.

In one example embodiment, the mineral material is a glass. Said glass can be a precursor of a glass-ceramic.

According to a second embodiment, the mineral material is a glass-ceramic colored by vanadium. The glass-ceramic contains a solid solution of β-quartz or a solid solution of β-spodumene, or further a mixture of solid solutions of β-quartz and β-spodumene, as a main crystalline phase. In the case when the glass-ceramic contains a mixture of solid solutions of β-quartz and of β-spodumene as main crystalline phase, the solid solution of β-quartz accounts for at least 70% by weight of the crystalline phase. Indeed, an amount greater than 30% by weight of solid solution of β-spodumene in the glass-ceramic would involve undesirable opacification of the glass-ceramic. More preferably, the glass-ceramic contains a solid solution of β-quartz as main crystalline phase and is suitable for use at high temperatures. The glass-ceramic is advantageously transparent (due to β-quartz) and mainly colored by vanadium oxide, in particular with view to a use in certain contexts, notably as a cooktop of dark color. It should be noted that the glass-ceramic may contain an efficient amount of at least one dye, such as vanadium oxide, and may contain other dyes which will assist or amplify the coloration induced by $V_2O_5$. Iron oxide $Fe_2O_3$ is one of the other dyes of the glass-ceramic. Thus, vanadium oxide and iron oxide can have a predominant role as mineral material dye.

The lithium aluminosilicate glass composition, advantageously a glass precursor of a glass-ceramic, contains multivalent elements which are mainly iron, vanadium (vanadium exists under several oxidation states) and tin. Their oxidation state determines the value of the chemical oxygen demand (called COD hereafter and determined according to the method entitled "Determination of reducing components in glass raw material" and described in pages 33-38 of the "Handbook of recommended analytical methods by ICG/TC 2 Chemical Durability and Analysis; International Commission on Glass 2009") of the material. The higher the oxidation state of these multivalent elements, the more the COD value decreases. It was surprisingly discovered, and this is the basis of the present disclosure, that when the COD value of the material is less than 0.18 mg $O_2$/g of material, the lithium aluminosilicate glass composition, advantageously a glass precursor of a glass-ceramic free of arsenic and antimony oxide (and of halides), was able to be refined with tin oxide as a fining agent at temperatures below 1,700° C. (i.e., at a standard temperature for conventional refining with $As_2O_3$ and/or $Sb_2O_3$). The material then contains a minimum or even zero number of bubbles.

It has to be noted that the COD value of the mineral materials can be used to measure their redox state. The COD value is a characteristic of these materials akin to their composition.

The amounts by weight of vanadium oxide and of iron oxide in the composition were determined, mainly in order to be able to produce glasses or glass-ceramics of a desired dark color. Moreover, these oxides also contribute to refining the glass at temperatures below 1,700° C.

As for tin oxide, it is present in said composition in an amount by weight of oxides comprised between 0.24 and 0.36% in order to introduce a sufficient amount of fining agent. The amount of $SnO_2$ should not exceed 0.36% by weight of oxides in the composition in order to avoid that the composition has melting difficulties or unacceptable devitrification, or that the material has coloration problems.

As for vanadium oxide, it is present in said composition in an amount by weight of oxides comprised between 0.030 and 0.060%, advantageously between 0.030 to 0.050% (such an amount has been found advantageous, more particularly in reference of a control of the transmission of glass-ceramics such as those used as cooktops).

Preferably, the composition of the materials contains from 0.27 to 0.33% of $SnO_2$, from 0.035 to 0,045% of $V_2O_5$, and from 0.080 to 0.090% of $Fe_2O_3$.

According to a non restricted embodiment, the composition of the materials, expressed in percentages by weight of oxides, further (in addition to the above (generally or preferred) indicated amounts of $SnO_2$, $V_2O_5$ and $Fe_2O_3$) contains:

| | | | |
|---|---|---|---|
| $SiO_2$ | 50 | — | 75 |
| $Al_2O_3$ | 17 | — | 27 |
| $Li_2O$ | 2 | — | 6 |
| MgO | 0 | — | 5 |
| ZnO | 0 | — | 5 |
| BaO | 0 | — | 5 |
| SrO | 0 | — | 5 |
| CaO | 0 | — | 3 |
| $Na_2O$ | 0 | — | 3 |
| $K_2O$ | 0 | — | 3 |
| $TiO_2$ | 0 | — | 5 |
| $ZrO_2$ | 0 | — | 5 |
| $B_2O_3$ | 0 | — | 3 |
| $P_2O_5$ | 0 | — | 8. |

Preferably, the composition of the materials, expressed in percentages by weight of oxides, contains:

| | | | |
|---|---|---|---|
| $SiO_2$ | 60 | — | 70 |
| $Al_2O_3$ | 18 | — | 22 |
| $Li_2O$ | 2.5 | — | 4 |
| MgO | 0 | — | 2 |
| ZnO | 0 | — | 3 |
| BaO | 0 | — | 4 |
| SrO | 0 | — | 4 |
| CaO | 0 | — | 2 |
| $Na_2O$ | 0 | — | 1 |
| $K_2O$ | 0 | — | 1 |
| $TiO_2$ | 1, 5 | — | 3.5 |
| $ZrO_2$ | 0 | — | 2.5 |
| $B_2O_3$ | | 0 | |
| $P_2O_5$ | 0 | — | 3. |

When the material is a glass-ceramic, the glass-ceramic is of the LAS type. It contains $LiO_2$, $Al_2O_3$ and $SiO_2$ as essential constituents of the solid solution of β-quartz and/or of the solid solution of β-spodumene.

In further embodiments, the disclosure relates to articles made, at least partly, advantageously entirely, of the disclosed mineral material (glass or glass-ceramic), as described above. Such an article is preferably made, at least partly, advantageously entirely, of a glass-ceramic.

Of course it is clear that the disclosed glass-ceramics are opportunely used as articles which upon use are subject to high temperatures. Their composition has been optimized for this purpose.

Thus, the glass-ceramic articles notably consist in cooking tops, cooking utensils and microwave oven soles.

According to yet a further embodiment, the disclosure relates to a method for obtaining a mineral material as described above. Said method comprises the melting of a vitrifiable batch mixture (a batch mixture able to be turned to glass and conventionally comprising (pre-existing) mineral glass(es) (cullets) and/or a mixture of mineral raw materials), the refining of the generated molten glass and the cooling of the refined molten glass. Said melting is applied onto a vitrifiable batch mixture, the composition of which, free of arsenic oxide and antimony oxide, except for inevitable traces, contains $SnO_2$, $V_2O_5$ and $Fe_2O_3$ in the percentages by weight indicated above, under sufficiently oxidizing conditions so that the cooled glass has a chemical oxygen demand of less than 0.18 mg $O_2$/g. A glass can be obtained by carrying out the above indicated melting, refining and cooling steps. To obtain a glass-ceramic, the method further comprises a crystallization heat treatment (ceramming heat treatment) of the cooled refined molten glass (it comprises melting, refining, cooling and ceramming steps).

The disclosure also relates to a method for obtaining an article as described above, comprising melting and refining a vitrifiable batch mixture (a batch mixture able to be turned to glass and conventionally comprising (pre-existing) mineral glass(es) (cullets) and/or a mixture of mineral raw materials), and then cooling the obtained refined molten glass and simultaneously shaping it into the desired shape for the targeted article; and optionally (if a glass-ceramic article is desired) ceramming the shaped glass. The melting can be applied to a vitrifiable batch mixture, the composition of which, free of arsenic oxide and antimony oxide, except for inevitable traces, contains $SnO_2$, $V_2O_5$ and $Fe_2O_3$ in the percentages by weight indicated above, under sufficiently oxidizing conditions so that the cooled glass has a chemical oxygen demand of less than 0.18 mg $O_2$/g.

In a characteristic way, said methods for obtaining a mineral material as described above and for obtaining an article as described above, are carried out, starting from a vitrifiable batch mixture which has a weight composition allowing to obtain that of a material (see more particularly the weight compositions with narrow ranges, presented above). Said composition contains, except for inevitable traces, neither any arsenic oxide nor any antimony oxide. It does not either contain any compounds which generate toxic compounds (halides being transformed into toxic gas). As fining agent, it contains tin oxide.

Moreover, it is incidentally recalled here that the disclosure also deals with the optimization of said methods with which it is possible to obtain a melting and refining step which, applied at a temperature below 1,700° C., gives very satisfactory results with tin oxide as fining agent. Thus, the melting and the refining of lithium aluminosilicate glass compositions containing vanadium, advantageously precursors of glass-ceramics, are advantageously carried out at a temperature of less than 1,700° C. (i.e. at a standard temperature for conventional refining with $As_2O_3$ and/or $Sb_2O_3$).

These standard conditions of melting and fining temperatures are reached when the melting step is performed on a batch mixture, such as previously described, under sufficiently oxidizing conditions so that the generated glass has a chemical oxygen demand of less than 0.18 mg $O_2$/g. At the moment of the melting of the vitrifiable batch mixture, the oxides of the multivalent elements undergo reduction and these multivalent elements are therefore present in reduced form. This reduction is accompanied by $O_2$ formation which allows refining of the glass. Surprisingly, it was observed that the melting and refining of the glass are particularly facilitated when they are carried out under sufficiently oxidizing conditions at temperatures below 1,700° C. Under these conditions for obtaining them, the disclosed glasses and glass-ceramics have a COD value of less than 0.18 mg $O_2$/g of material. It should be noted that the COD value does not change after ceramming.

It is possible to obtain "sufficiently oxidizing conditions" by different ways, which may be combined, i.e., by introducing oxidizing compounds, notably nitrates into the vitrifiable batch mixture, by applying oxygen bubbling during the melting, and/or by using a melting method leading to an oxidizing atmosphere.

With these different ways, at the origin of sufficiently oxidizing conditions, it is possible to obtain efficient melting and refining at temperatures below 1,700° C. and COD values of less than 0.18 mg $O_2$/g for the material.

When the vitrifiable batch mixture comprises oxidizing compounds, said methods for obtaining a mineral material as described above and for obtaining an article as described above, are generally carried out with one of the following steps: at least 1.5% by mole of oxide(s) of constitutive element(s) of the glass, in the composition of the glass, are introduced as nitrates into the vitrifiable batch mixture. By the expression "are introduced as nitrates", it is understood that the oxide(s) of constitutive element(s) of the glass come from the transformation of the corresponding nitrate(s) present in the vitrifiable batch mixture. It should be noted that determining the amount of said corresponding nitrate(s) is within the reach of one skilled in the art. Of course, one skilled in the art understands that the oxide(s) of constitutive element(s) of the glass, which is(are) introduced as nitrates into the vitrifiable batch mixture, correspond to any compound present in the glass in oxidized form, capable of originating from a corresponding nitrate by transformation during the melting step, advantageously at temperatures below 1,700° C.

Advantageously, the oxides of constitutive elements of the glass, which are able to be introduced as nitrates into the vitrifiable batch mixture, are selected from alkaline oxides ($Li_2O$, $Na_2O$, $K_2O$), alkaline earth oxides (MgO, CaO, SrO, BaO, ZnO), aluminium and zirconium oxides. Thus, the vitrifiable batch mixture may comprise nitrates of alkaline, earth alkaline, aluminium and/or zirconium elements.

More preferably, the vitrifiable batch mixture comprises nitrates selected from barium, sodium, potassium, ammonium nitrates and mixtures of at least two of said nitrates. In embodiments, an amount of nitrate ions coming from at least one element which does not form the glass, expressed in molar percentage, is included in the vitrifiable batch mixture, said amount of nitrate ions being equal to the one provided when at least 1.5% by mole of oxide(s) of constitutive element(s) of the glass, in the composition of the glass, are introduced as nitrates into the vitrifiable batch mixture.

Advantageously, said amount of nitrate ions comes from ammonium nitrate. Ammonium nitrate is not a constitutive element of the glass since it does not appear in the composition of the material: it decomposes as a gas during the melting step of the load. A mixture of nitrate ions of constitutive element(s) of the glass and of nitrate ions coming from at least one element which does not form the glass, is included in the vitrifiable batch mixture in an amount, expressed in molar percentage, equivalent to the one provided when at least 1.5% by mole of oxide(s) of constitutive element(s) of the glass, in the composition of the glass, are introduced as nitrates into the vitrifiable batch mixture.

Preferably, the mixture of nitrate ions of constitutive element(s) of the glass and of nitrate ions coming from at least one element which does not form the glass, is a mixture of at least one nitrate selected from barium, sodium, potassium and strontium nitrates and of ammonium nitrates.

In all the cases, the amount of nitrates included in the vitrifiable batch mixture is preferably limited to the equivalent of the one provided when 10% by mole of oxide(s) of constitutive element(s) of the glass, in the composition of the glass, are introduced as nitrates into the vitrifiable batch mixture, in order to avoid melting difficulties related to gas formation during decomposition of the nitrates.

Thus, it is possible to obtain mineral materials selected from lithium aluminosilicate glasses containing vanadium, advantageously precursors of glass-ceramics, and glass-ceramics colored by vanadium containing solid solution(s) of β-quartz or(and) β-spodumene as main crystalline phase, articles of said mineral materials, as well as methods for forming glasses, glass-ceramics and articles of said glasses and glass-ceramics, which effectively solve the listed technical problems. The melting and refining steps can efficiently be carried out at temperatures below 1,700° C. with the use of tin oxide as a fining agent and the material compositions are free of (compounds generating) toxic compounds. Moreover, the methods for forming said glasses, glass-ceramics and articles of said glasses and glass-ceramics leave a mark on the obtained products (which thus are distinguished from the products of the prior art): a COD value of less than 0.18 mg $O_2$/g.

EXAMPLES

In order to produce 1 kg batches of glass precursor of glass-ceramic, raw materials were mixed carefully in the proportions (weight proportions expressed in oxides) indicated in Table 1 hereafter.

The two glasses for which the composition is indicated in the following Table 1 were melted. The compositions differ in the nature of the raw materials used. Example 1 represents a precursor glass according to embodiments. The vitrifiable batch mixture with which said precursor glass of Example 1 is obtained, comprises barium, sodium, and potassium nitrates. Example 2 represents a comparative precursor glass. The vitrifiable batch mixture with which said precursor glass of Example 2 is obtained, comprises barium, sodium and potassium carbonates. Examples 1 and 2 are, for the remainder of the elements, identical in every point.

The mixtures were placed, for melting (and refining), in platinum crucibles. The filled crucibles were introduced into an electric oven pre-heated to 1,400° C. Therein, they were subject to the melting cycle comprising (a) a temperature increase from 1,400° C. to 1,600° C. within 2 hrs, (b) a temperature increase from 1600 to 1650° C. within 1 hour, and (c) a hold for 2 hours at a temperature of 1,650° C. The melting and refining time are voluntarily short in order to be able to compare both glasses.

The crucibles were then taken out of the oven and the melted glass was poured on a heated steel plate. It was laminated thereon to a thickness of 5 mm and annealed for 1 hr at 650° C.

The number of bubbles (or seeds) was automatically counted with a camera coupled with an image analysis.

The COD value was determined according to the method entitled "Determination of reducing components in glass raw materials" and described in pages 33-38 of the "Handbook of recommended analytical methods by ICG/TC 2 Chemical Durability and Analysis; International Commission on Glass 2009".

Laminated glass plates were then subjected to the following ceramming treatment: (a) a temperature increase of the oven from room temperature (about 20-25° C.) to 660° C., within 17 min, (b) a temperature increase from 660° C. to 820° C. within 25 min, (c) a temperature increase from 820° C. to 920° C. within 7 min, (d) a hold at 920° C. for 10 mins, and (e) cooling at the cooling rate of the oven.

The optical properties of the glass-ceramic plates obtained were measured on polished samples 3 mm thick. The illuminant C (observer at)2° was used.

TABLE 1

| Examples | 1 and 2 (weight %) | 1 and 2 (mole %) | 1 | 2 |
|---|---|---|---|---|
| $SiO_2$ | 65.03 | 70.92 | | |
| $Al_2O_3$ | 20.67 | 13.28 | | |
| $Li_2O$ | 3.79 | 8.31 | | |
| MgO | 0.32 | 0.52 | | |
| ZnO | 1.5 | 1.21 | | |
| BaO | 2.47 | 1.06 | Barium nitrate | Barium carbonate |
| SrO | 0 | 0 | | |
| CaO | 0.42 | 0.49 | | |
| $Na_2O$ | 0.62 | 0.66 | Sodium nitrate | Sodium carbonate |
| $K_2O$ | 0.24 | 0.11 | Potassium nitrate | Potassium carbonate |
| $TiO_2$ | 2.98 | 2.44 | | |
| $ZrO_2$ | 1.55 | 0.82 | | |
| $B_2O_3$ | 0 | 0 | | |
| $P_2O_5$ | 0 | 0 | | |
| $SnO_2$ | 0.29 | 0.13 | | |
| $V_2O_5$ | 0.044 | 0.02 | | |
| $Fe_2O_3$ | 0.085 | 0.03 | | |
| Total | 100 | 100 | | |
| $Na_2O + K_2O + BaO + SrO$ (mole %) | | 1.83 | | |
| COD (mg $O_2$/g glass) | | | 0.16 | 0.19 |
| Number of bubbles or seeds per cm³ | | | 2 | 16 |
| Visible transmission after ceramming | | | 4.60% | 4.70% |

The results show that the disclosed glass, precursor of a glass-ceramic, (nitrates in the batch mixture) contains much fewer bubbles than the comparative glass (carbonates in the batch mixture). The COD value is lower (less than 0.18 mg $O_2$/g of glass) and confirms that the glass is more oxidized. The COD value does not change after ceramming.

It should be noted that these examples were achieved at a laboratory scale. However, they represent melting and refining carried out under conditions at an industrial scale.

Glasses with similar compositions were melted in an industrial furnace in oxidizing conditions. They were obtained with a satisfactory quality. Table 2 indicates their compositions and their COD value.

TABLE 2

| Examples | 3 | 4 |
|---|---|---|
| $SiO_2$ | 65.558 | 65.575 |
| $Al_2O_3$ | 20.6 | 20.6 |
| $Li_2O$ | 3.75 | 3.75 |
| MgO | 0.25 | 0.25 |
| ZnO | 1.5 | 1.5 |
| BaO | 2.4 | 2.4 |
| CaO | 0.38 | 0.37 |
| $Na_2O$ | 0.55 | 0.54 |
| $K_2O$ | 0.23 | 0.23 |
| $TiO_2$ | 3.05 | 3.05 |
| $ZrO_2$ | 1.3 | 1.3 |
| $SnO_2$ | 0.29 | 0.28 |
| $V_2O_5$ | 0.042 | 0.054 |
| $Fe_2O_3$ | 0.086 | 0.086 |
| $Cr_2O_3$ | 0.014 | 0.015 |
| COD (mg $O_2$/g glass) | 0.12 | 0.14 |

What is claimed is:
1. A mineral material selected from a lithium aluminosilicate glass containing vanadium and a glass-ceramic colored by vanadium containing solid solution(s) of β-quartz and/or β-spodumene as main crystalline phase, advantageously containing a solid solution of β-quartz as main crystalline phase, comprising a composition, free of halides, arsenic oxide and antimony oxide, except for inevitable traces, expressed in percentages by weight of oxides, which contains:
from 0.24 to 0.36% of $SnO_2$,
from 0.030 to 0.060% of $V_2O_5$, and
from 0.075 to 0.095% of $Fe_2O_3$; and
a chemical oxygen demand of less than 0.18 mg $O_2/g$.

2. The mineral material according to claim 1, wherein the material is a glass.

3. The mineral material according to claim 1, wherein the material is a glass-ceramic.

4. The mineral material according to claim 1, wherein the composition contains from 0.030 to 0.050% of $V_2O_5$.

5. The mineral material according to claim 1, wherein the composition contains:
from 0.27 to 0.33% of $SnO_2$,
from 0.035 to 0.045% of $V_2O_5$, and
from 0.080 to 0.090% of $Fe_2O_3$.

6. The mineral material according to claim 1, wherein the composition, expressed in percentages by weight of oxides, contains:

| | | | |
|---|---|---|---|
| $SiO_2$ | 50 | — | 75 |
| $Al_2O_3$ | 17 | — | 27 |
| $Li_2O$ | 2 | — | 6 |
| MgO | 0 | — | 5 |
| ZnO | 0 | — | 5 |
| BaO | 0 | — | 5 |
| SrO | 0 | — | 5 |
| CaO | 0 | — | 3 |
| $Na_2O$ | 0 | — | 3 |
| $K_2O$ | 0 | — | 3 |
| $TiO_2$ | 0 | — | 5 |
| $ZrO_2$ | 0 | — | 5 |
| $B_2O_3$ | 0 | — | 3 |
| $P_2O_5$ | 0 | — | 8. |

7. The mineral material according to claim 1, wherein the composition, expressed in percentages by weight of oxides, contains:

| | | | |
|---|---|---|---|
| $SiO_2$ | 60 | — | 70 |
| $Al_2O_3$ | 18 | — | 22 |
| $Li_2O$ | 2.5 | — | 4 |
| MgO | 0 | — | 2 |
| ZnO | 0 | — | 3 |
| BaO | 0 | — | 4 |
| SrO | 0 | — | 4 |
| CaO | 0 | — | 2 |
| $Na_2O$ | 0 | — | 1 |
| $K_2O$ | 0 | — | 1 |
| $TiO_2$ | 1.5 | — | 3.5 |
| $ZrO_2$ | 0 | — | 2.5 |
| $B_2O_3$ | | 0 | |
| $P_2O_5$ | 0 | — | 3. |

8. An article made at least partly of a mineral material according to claim 1.

9. An article made entirely of a mineral material according to claim 1.

10. The article of claim 9, which comprises a cooking top, a cooking utensil or a microwave oven sole.

11. A method for obtaining a mineral material according to claim 1, comprising:
melting a vitrifiable batch mixture to form a molten glass, refining the molten glass, and
cooling of the refined molten glass, wherein
the melting is applied to a vitrifiable batch mixture under sufficiently oxidizing conditions so that the cooled glass has a chemical oxygen demand of less than 0.18 mg $O_2/g$, the composition of which is free of halides, arsenic oxide and antimony oxide, except for inevitable traces, and contains from 0.27 to 0.33% of $SnO_2$, from 0.035 to 0.045% of $V_2O_5$, and from 0.080 to 0.090% of $Fe_2O_3$.

12. The method according to claim 11, further comprising a ceramming heat treatment of said cooled refined molten glass.

13. A method for obtaining an article according to claim 9, comprising:
melting and refining a vitrifiable batch mixture;
cooling of the refined molten glass and simultaneously shaping the refined molten glass into a desired shape, and optionally
ceramming the shaped glass, wherein
the melting is applied to a vitrifiable batch mixture under sufficiently oxidizing conditions so that the cooled glass has a chemical oxygen demand of less than 0.18 mg $O_2/g$, the composition of which is free of halides, arsenic oxide and antimony oxide, except for inevitable traces, and contains from 0.27 to 0.33% of $SnO_2$, from 0.035 to 0.045% of $V_2O_5$, and from 0.080 to 0.090% of $Fe_2O_3$.

14. The method according to 11, wherein
at least 1.5% by mole of oxide(s) of constitutive element(s) of the glass, in the composition of the glass, are introduced as nitrates into the vitrifiable batch mixture; or
an amount of nitrate inns coming from at least one element which does not form the glass, expressed in molar percentage, is included in the vitrifiable batch mixture, said amount of nitrate ions being equal to that provided when at least 1.5% by mole of oxide(s) of constitutive element (s) of the glass, in the composition of the glass, are introduced as nitrates into the vitrifiable batch mixture; or
a mixture of nitrate ions of constitutive element(s) of the glass and of nitrate ions coming from at least one element which does not form the glass, is included in the vitrifiable batch mixture in an amount, expressed in molar percentage, equivalent to the one provided when at least 1.5% by mole of oxide(s) of constitutive element (s) of the glass, in the composition of the glass, are introduced as nitrates into the vitrifiable batch mixture.

15. The method according to claim 14, wherein said nitrates are selected from barium, sodium, potassium, ammonium nitrates, and from the mixture of at least two of said nitrates.

16. The method according to any one of claim 14, wherein said melting is carried out with oxygen bubbling.

* * * * *